United States Patent
Dabah et al.

(10) Patent No.: US 10,152,532 B2
(45) Date of Patent: Dec. 11, 2018

(54) METHOD AND SYSTEM TO ASSOCIATE MEANINGFUL EXPRESSIONS WITH ABBREVIATED NAMES

(71) Applicant: AT&T Interwise Ltd., Airport City (IL)

(72) Inventors: Daniel Dabah, Kfar Sava (IL); Elad Mazaki, Petah Tikva (IL)

(73) Assignee: AT&T INTERWISE LTD., Airport City (IL)

( * ) Notice: Subject to any disclaimer, the term of this patent is extended or adjusted under 35 U.S.C. 154(b) by 919 days.

(21) Appl. No.: 14/454,477

(22) Filed: Aug. 7, 2014

(65) Prior Publication Data

US 2016/0041990 A1 Feb. 11, 2016

(51) Int. Cl.
*G06F 17/30* (2006.01)
*G06F 17/27* (2006.01)

(52) U.S. Cl.
CPC ........ *G06F 17/3061* (2013.01); *G06F 17/276* (2013.01); *G06F 17/277* (2013.01); *G06F 17/30696* (2013.01); *G06F 17/3064* (2013.01)

(58) Field of Classification Search
CPC ............. G06F 17/3064; G06F 17/2276; G06F 17/30672; G06F 17/277; G06F 17/2785; G06F 17/30389; G06F 17/3061; G06F 17/30696; G06F 17/30979; G06F 17/3053
See application file for complete search history.

(56) References Cited

U.S. PATENT DOCUMENTS

| 6,668,354 | B1 * | 12/2003 | Chen ..................... G06F 17/211 715/255 |
| 6,934,767 | B1 | 8/2005 | Jellinek |
| 7,028,038 | B1 | 4/2006 | Pakhomov |
| 7,136,876 | B1 | 11/2006 | Adar et al. |
| 7,451,188 | B2 * | 11/2008 | Cheung ................. G06F 17/241 709/205 |

(Continued)

FOREIGN PATENT DOCUMENTS

| CN | 100428241 C | 10/2008 |
| EP | 0280866 A2 | 9/1988 |

(Continued)

OTHER PUBLICATIONS

Anonymous: "Regular Expression—Wikipedia, the free encyclopedia", Jul. 27, 2014. p. 1, paragraph 1-paragraph 5.

(Continued)

*Primary Examiner* — Merilyn P Nguyen

(57) ABSTRACT

A method of associating a meaningful term with a first abbreviated name includes selecting a first meaningful term based on similarity between the first meaningful term and expansion of a first abbreviated term, selecting the first meaningful term based on collocation of a second abbreviated term, and associating the first meaningful term with the first abbreviated term. The first abbreviated term is associated with a first abbreviated name. The second abbreviated term and a third abbreviated term are associated with a second abbreviated name. The second abbreviated term satisfies a matching criterion associated with the first abbreviated term. A corresponding system and computer-readable device are also disclosed.

20 Claims, 10 Drawing Sheets

(56) References Cited

U.S. PATENT DOCUMENTS

| | | | |
|---|---|---|---|
| 7,603,114 B2 * | 10/2009 | Carlson | H04W 8/10 |
| | | | 379/207.12 |
| 7,672,833 B2 | 3/2010 | Blume et al. | |
| 7,809,715 B2 | 10/2010 | Wei et al. | |
| 7,848,918 B2 | 12/2010 | Li et al. | |
| 7,865,358 B2 * | 1/2011 | Green | G06F 17/2785 |
| | | | 704/10 |
| 8,086,623 B2 | 12/2011 | Dettinger et al. | |
| 8,316,007 B2 | 11/2012 | Liao | |
| 8,364,470 B2 | 1/2013 | Abraham et al. | |
| 8,370,328 B2 | 2/2013 | Woytowitz et al. | |
| 8,498,999 B1 * | 7/2013 | Bhalotia | G06F 17/3064 |
| | | | 707/767 |
| 8,589,370 B2 | 11/2013 | Feng et al. | |
| 8,594,996 B2 | 11/2013 | Liang et al. | |
| 8,645,184 B2 * | 2/2014 | Nasukawa | G06Q 10/00 |
| | | | 705/7.29 |
| 8,645,372 B2 | 2/2014 | Diamond et al. | |
| 8,751,466 B1 * | 6/2014 | Tsay | G06F 17/30864 |
| | | | 707/700 |
| 9,135,308 B2 * | 9/2015 | Bhalotia | G06F 17/3064 |
| 9,355,084 B2 * | 5/2016 | Doornenbal | G06F 17/241 |
| 2002/0178394 A1 | 11/2002 | Bamberger et al. | |
| 2003/0120640 A1 | 6/2003 | Ohta et al. | |
| 2005/0108001 A1 | 5/2005 | Aarskog | |
| 2005/0289168 A1 * | 12/2005 | Green | G06F 17/3064 |
| 2007/0220037 A1 * | 9/2007 | Srivastava | G06F 17/30864 |
| 2008/0033714 A1 | 2/2008 | Gupta | |
| 2008/0086297 A1 | 4/2008 | Li et al. | |
| 2009/0259629 A1 * | 10/2009 | Wei | G06F 17/30672 |
| 2010/0325143 A1 * | 12/2010 | Straub | G06F 17/3087 |
| | | | 707/769 |
| 2012/0084076 A1 * | 4/2012 | Boguraev | G06F 17/2735 |
| | | | 704/9 |
| 2012/0102045 A1 | 4/2012 | Cucerzan et al. | |
| 2012/0330648 A1 | 12/2012 | Boguraev et al. | |
| 2013/0191739 A1 * | 7/2013 | Bank | G06F 17/2276 |
| | | | 715/259 |
| 2013/0204624 A1 * | 8/2013 | Ben-Ezri | G10L 13/08 |
| | | | 704/260 |
| 2013/0246047 A1 | 9/2013 | Vassilieva et al. | |
| 2015/0019224 A1 * | 1/2015 | Osawa | G10L 13/08 |
| | | | 704/246 |
| 2015/0066478 A1 * | 3/2015 | Onishi | G06F 17/2785 |
| | | | 704/9 |

FOREIGN PATENT DOCUMENTS

| | | |
|---|---|---|
| EP | 0319193 A2 | 6/1989 |
| WO | WO 2006023622 A2 | 3/2006 |
| WO | WO 2007109004 A1 | 9/2007 |

OTHER PUBLICATIONS

PCT Search Report received in corresponding U.S. Application No. PCT/IB2015/001794, dated Dec. 9, 2015. pp. 1-11.

Gravano, Luis, et al., "Qprober; A system for automatic classification of hidden-web databases", ACM Transactions on Information Systems (TOIS) 21.1, 2003, pp. 1-41.

Attardi, Giuseppe, et al., "Automatic web page categorization by link and context analysis", Proceedings of THAI, vol. 99, No. 99, 1999.

Gu, Tao, et al., "An ontology-based context model in intelligent environments", Proceedings of communication networks and distributed systems modeling and simulation conference, vol. 2004, 2004.

Hong, Jong-Yi, et al., "Context-aware systems: A literature review and classification", Expert Systems with Applications 36.4, 2009, 8509-8522.

Dakka, Wisam, et al., "Automatic extraction of useful facet hierarchies from text databases", Data Engineering, ICDE 2008, IEEE 24th International Conference, IEEE, 2008.

Beitzel, Steven M., et al., "Improving automatic query classification via semi-supervised learning", Data Mining, Fifth IEEE International Conference, IEEE, 2005.

* cited by examiner

METHOD AND SYSTEM TO ASSOCIATE MEANINGFUL EXPRESSIONS WITH ABBREVIATED NAMES

BACKGROUND

Technical Field

Embodiments disclosed herein relate to associating meaningful expressions with abbreviated names that reference data stores.

Brief Description of Related Art

Many organizations maintain large stores of data related to their business or endeavor. There is a growing trend towards analyzing these data stores to improve research and business practices. For example, businesses analyze customer churn rates in order to improve customer retention. Data scientists employed to gather and analyze relevant data are limited based on their ability to find appropriate data to process. However the ability to find appropriate data can be impeded by the use of abbreviated names to reference the data stores and data store entities. Additionally, search engines can have difficulty processing abbreviated names when responding to a search query. Furthermore, data stores are often poorly documented, or not documented at all, without providing sufficient clues to clarify the meaning of abbreviated names. One solution is to task subject matter experts with manually mapping the abbreviated names to meaningful expressions or categories. However, this solution is difficult to perform on a large scale, requiring significant human effort and time. Other solutions analyze actual data in data stores. However accessing sensitive content has security limitations.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The disclosure is directed to a system to associate meaningful expressions to abbreviated names of data store. The system includes a processing device and a storage device storing instructions that, when executed by the processing device, cause the processing device to perform operations. The operations include selecting a first meaningful term based on similarity between the first meaningful term and expansion of a first abbreviated term, selection of the first meaningful term being based on satisfaction of a collocation criterion associated with a second abbreviated term. The first abbreviated term is associated with a first abbreviated name. The second abbreviated term and a third abbreviated term are associated with a second abbreviated name. The second abbreviated term satisfies a matching criterion associated with the first abbreviated term. The operations further include associating the first meaningful term with the first abbreviated term.

The operations may further include selecting a first meaningful expression based on similarity between a second meaningful term and expansion of the second abbreviated term, and similarity between a third meaningful term and expansion of the third abbreviated term. The first meaningful expression includes the second meaningful term and the third meaningful term.

The operations may further include selecting the first meaningful term based on the second meaningful term.

The operations may further include selecting a second meaningful expression including the first meaningful term and a fourth meaningful term. The fourth meaningful term is selected based on similarity between the fourth meaningful term and expansion of a fourth abbreviated term associated with the first abbreviated name. The second meaningful expression is selected based on a first collocation and a second collocation. The first collocation is associated with the first meaningful term and the fourth meaningful term. The second collocation is associated with the expansion of the first abbreviated term and the expansion of the fourth abbreviated term. The operations further include associating the first abbreviated term and the fourth abbreviated term with the second meaningful expression.

The operations may further include generating a regular expression associated with the first abbreviated term. The expansion of the first abbreviated term is based on the regular expression.

The operations may further include processing a search query, the processing including comparing a query term of the search query to the first meaningful term.

The operations may further include displaying the first meaningful term and the first abbreviated term, and associating the query term with the first abbreviated term based on user feedback.

The operations may further include determining a first frequency of occurrence of the first abbreviated term in a first plurality of names associated with a data store. In an embodiment, the first abbreviated name and the second abbreviated name are associated with the data store. The operations include determining a second frequency of occurrence of the first abbreviated term in a second plurality of names. The second plurality of names is associated with a plurality of data stores. The plurality of data stores is included in a universe. The universe includes the data store. The operations further include determining a role of the first abbreviated term based on the first frequency of occurrence and the second frequency of occurrence.

In an embodiment, the first abbreviated name and the second abbreviated name are associated with a data store. The operations may further include determining a frequency of occurrence of the first abbreviated term in a first plurality of names. The first plurality of names is associated with the data store. The operations further include determining a role of the first abbreviated term based on the frequency of occurrence and a position of the first abbreviated term in the first abbreviated name.

The disclosure is further directed to a method to associate meaningful expressions to abbreviated names of data store. The method includes selecting, by a processing device, a first meaningful term based on similarity between the first meaningful term and expansion of a first abbreviated term. Selection of the first meaningful term is further based on satisfaction of a collocation criterion associated with a second abbreviated term. The first abbreviated term is associated with a first abbreviated name. The second abbreviated term and a third abbreviated term are associated with a second abbreviated name. The second abbreviated term satisfies a matching criterion associated with the first abbreviated term. The method further includes associating the first meaningful term with the first abbreviated term.

The method may further includes selecting a first meaningful expression based on similarity between a second meaningful term and expansion of the second abbreviated term, and similarity between a third meaningful term and expansion of the third abbreviated term. The first meaningful expression includes the second meaningful term and the third meaningful term.

The method may further include selecting the first meaningful term based on the second meaningful term.

The method may further include selecting a second meaningful expression including the first meaningful term and a fourth meaningful term. The fourth meaningful term is selected based on similarity between the fourth meaningful term and expansion of a fourth abbreviated term associated with the first abbreviated name. The second meaningful expression is selected based on a first collocation and a second collocation. The first collocation is associated with the first meaningful term and the fourth meaningful term. The second collocation is associated with the expansion of the first abbreviated term and the expansion of the fourth abbreviated term. The method further includes associating the first abbreviated term and the fourth abbreviated term with the second meaningful expression.

The method may further include generating a regular expression associated with the first abbreviated term. The expansion of the first abbreviated term is based on the regular expression.

The method may further include processing a search query. Processing the search query includes comparing a query term of the search query to the first meaningful term.

The method may further include displaying the first meaningful term and the first abbreviated term, and associating the query term with the first abbreviated term based on user feedback.

The method may further include determining a first frequency of occurrence of the first abbreviated term in a first plurality of names associated with a data store. In an embodiment, the first abbreviated name and the second abbreviated name are associated with the data store. The method includes determining a second frequency of occurrence of the first abbreviated term in a second plurality of names. The second plurality of names is associated with a plurality of data stores. The plurality of data stores is included in a universe. The universe includes the data store. The method further includes determining a role of the first abbreviated term based on the first frequency of occurrence and the second frequency of occurrence.

The method may further include determining a frequency of occurrence of the first abbreviated term in a first plurality of names. The first plurality of names is associated with a data store. In an embodiment, the first abbreviated name and the second abbreviated name are associated with the data store. The method further includes determining a role of the first abbreviated term based on the frequency of occurrence and a position of the first abbreviated term in the first abbreviated name.

The disclosure is yet further directed to a computer-readable device to store instructions that, when executed by a processing device, perform operations to associate meaningful expressions to abbreviated names of data store. The operations include selecting a first meaningful term based on similarity between the first meaningful term and expansion of a first abbreviated term, selection of the first meaningful term being based on satisfaction of a collocation criterion associated with a second abbreviated term. The first abbreviated term is associated with a first abbreviated name. The second abbreviated term and a third abbreviated term are associated with a second abbreviated name. The second abbreviated term satisfies a matching criterion associated with the first abbreviated term. The operations further include associating the first meaningful term with the first abbreviated term.

The operations may further include selecting a first meaningful expression based on similarity between a second meaningful term and expansion of the second abbreviated term, and similarity between a third meaningful term and expansion of the third abbreviated term. The first meaningful expression includes the second meaningful term and the third meaningful term. The operations may further include selecting the first meaningful term based on the second meaningful term.

Embodiments will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

The embodiments described herein are directed to methods and systems of expanding, determining similar meaningful expressions, disambiguating, and classifying abbreviated names of data stores. One embodiment of the method is performed by comparing expansions of abbreviated terms associated with the abbreviated names to meaningful terms stored in a corpus. Expanded terms are formed by inserting characters into the abbreviated terms by using regular expressions. The regular expressions are based on naming rules used by software developers, e.g., when developing the data source and generating the names.

Meaningful terms in the corpus are compared to the expansions and selected based on similarities. Similarity is determined based on proximity and collocation. When there are multiple selected meaningful expressions, disambiguation is performed by using collocation to select a final meaningful match from the multiple selected meaningful expressions. Disambiguation can also be performed by using links to other data stores. Final meaningful matches can be stored in a term dictionary 132 as related to the abbreviated name. A search engine receives search queries to search the data store and generate search results. A feedback engine processes user feedback regarding relevance and correctness of the search results to update the corpus.

Figure 1:
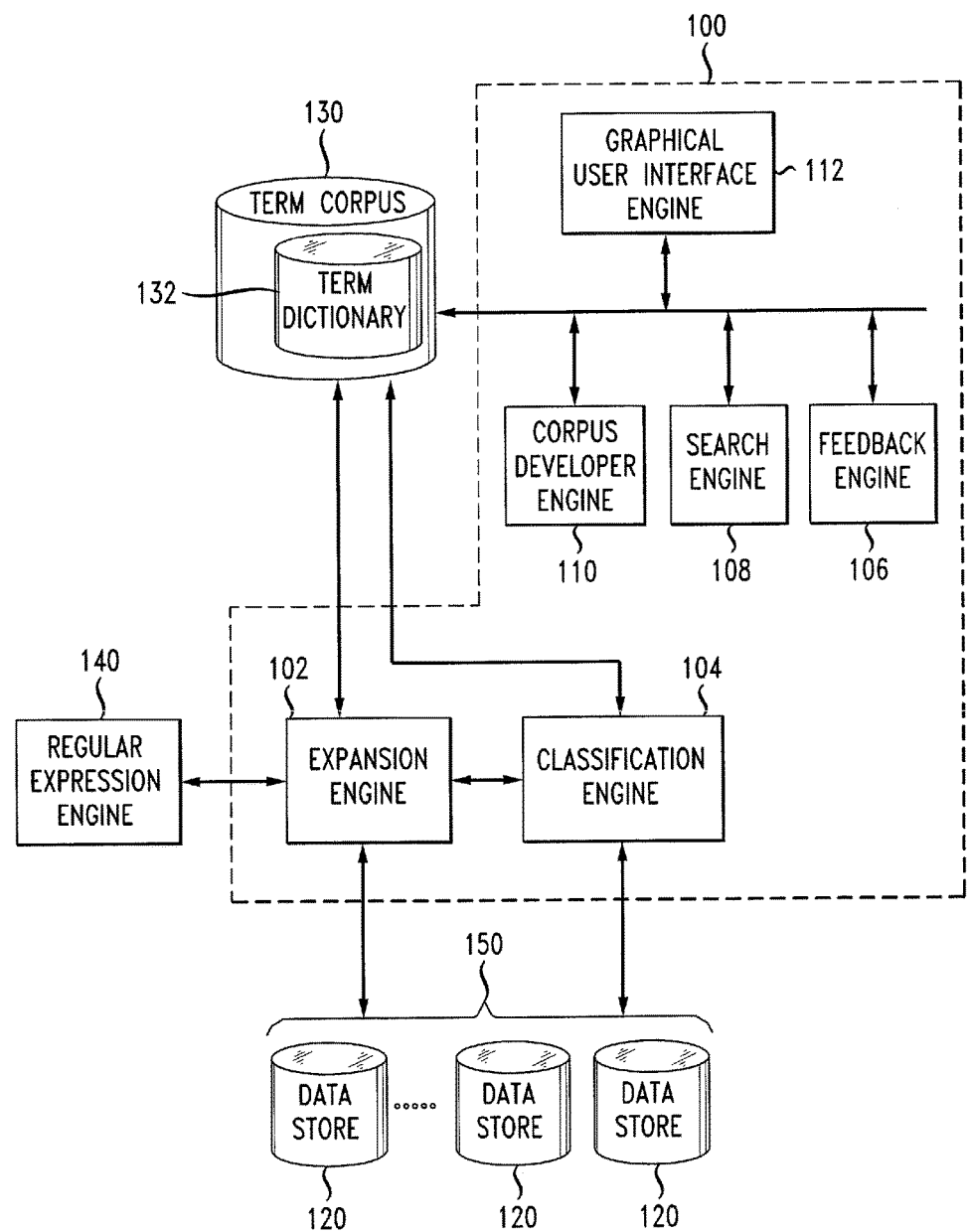
FIG. 1 shows a block diagram of a system to associate meaningful expressions to abbreviated names of data stores in accordance with the disclosure herein.

FIG. 1 shows a block diagram of a name processing system 100. The system 100 includes an expansion engine 102 and a classification engine 104 to process abbreviated names associated with data store 120. The term "data store," as used herein, refers to a repository for storing data. An abbreviated name associated with the data store 120 can reference, e.g., label, the data store 120 or an entity included in the data store 120. For example, an abbreviated name can be the label of a database, a table and columns of the table, a file and fields of the file, objects and attributes of the objects, and keys (e.g., record keys) that include unique identifiers to identify items stored in the data store 120.

The abbreviated name can have multiple abbreviated terms, each of which includes one or more characters. A term is defined herein as a part of a name that includes one or more characters. An abbreviated term can be, for example, an abbreviation of a word or multiple words. The term "abbreviation," as used herein, refers to a shortened version of a word or expression, and can include, for example, a truncated form (e.g., "cust" for "customer," an acronym (e.g., "DOT" for "date of termination," and/or omission of selected characters ("ntwrk" for "network"). "Expanding" an abbreviated term, as used herein, refers to approximating an unabbreviated form of the term by inserting characters into the term. For example, an abbreviated name including the abbreviated terms "acct," "lckd," and "rsn" can be expanded into the name "account locked reason."

The terms can be separated by a character delimiter, such as a space or an underscore (e.g., "ACCT_LCKD_RSN"), or by another rule, such as CamelCase (e.g., "AcctLckdRsn"), in which a capital letter indicates the beginning of a new term. A name can include multiple terms that are not separated by a character delimiter (e.g., "ACCTLCK-DRSN"), but which can be recognized, such as by recursive searching for compound terms.

Software developers tend to use a limited set of rules when naming data stores and their entities. One of these rules includes abbreviating a term by omitting characters from the term, and concatenating a few abbreviations to form a name. Another rule includes using pairs of abbreviations to create a meaningful term. "Meaningful terms" as defined herein refers to terms that are readable and have a widely accepted and apparent meaning. A meaningful term can be an expanded word form of an abbreviation. For example, "locked" is a meaningful term for the abbreviated term "LCKD." Meaningful expressions include a sequence of meaningful terms.

The naming rules can influence how a term is abbreviated, the order of the term in the name relative to other terms, how often the term is used within the data store 120 or universe 150 in relation to other terms, the position of the term in its name, and the location of the term's name in the data store 120. In accordance with naming rules, these characteristics can be indicative of the role of the name, such as whether it can be used to classify the data store or entity that it names, or whether it has a particular role in the data store, such as referencing a key, e.g., a record key. A key is defined herein, as an entity that stores values that uniquely identify another entity. Accordingly, naming rules can be used for expanding (defined above), disambiguating (further defined below), and classifying (further defined below).

The data store 120 can include a physical or logical framework for storing data. Examples of data store 120 include a database (e.g., relational, object, object-relational), a table, a graph or tree, a hash, a set, and an array. Examples of entities of the data store 120 include a column, attribute, record, field, object, node, element (e.g., of a set), union, pointer, non-directed link, and directed link.

The data store 120 can be associated with metadata 122 that describes the data store 120. The metadata can include abbreviated names of the data store 120 and entities of the data store 120. References herein to accessing abbreviated names and terms associated with the data store 120, such as for determining or comparing the abbreviated names or terms, include accessing abbreviated names or terms included in metadata associated with the data store 120.

The expansion engine 102 accesses a name (referred to as the current name) associated with the data store 120. The expansion engine 102 processes a group of one or more of the abbreviated terms (the current term group) of the current name. A term group can include one abbreviated term, a pair, a group of three or more, or the entire current name. The terms can be sequenced in a particular order.

The expansion engine 102 determines one or more candidate expansion terms that are expanded from terms included in the current term group. The expansion engine 102 compares permutations of the candidate expansion terms associated with the current name to meaningful expressions in the corpus 130. Each meaningful expression includes a sequence of one or more meaningful terms. Corpus is defined herein as a repository for storing textual data, such as one or more databases or look-up tables. In the present example, the corpus is a database.

The expansion engine 102 can access a regular expression engine 140 to generate the candidate expansion terms. The expansion engine 102 inserts regular expression characters into the abbreviated terms to form a regular expression. Accordingly, the term "regular expression," as used herein, refers to an abbreviated term into which regular expression characters have been inserted. The regular expression characters include one or more special characters that have an assigned meaning that governs where, how many, or which, characters can be inserted into the abbreviated term to replace the regular expression character. The regular expression thus forms a pattern that the regular expression engine 140 can use to insert characters into the abbreviated term in accordance with the regular expression characters.

The expansion engine 102 transmits a request to the regular expression engine 140 to expand the regular expression and return each expanded version of the regular expression that occurs in the corpus 130 as a candidate expansion term. The request includes the regular expression and a reference to the corpus 130 as arguments.

The regular expression engine 140 receives the request and expands the regular expression to generate expansion terms by replacing the regular expression characters with a combination of one or more characters, as governed by rules associated with the particular regular expression character. A character that replaces a regular expression character and is inserted into an expansion term, referred to herein as a replacement character, has a defined meaning. Examples of a replacement character include an alphanumeric character, punctuation symbol, mathematical symbol, or other symbol having a defined meaning. Each different combination of replacement characters inserted into the abbreviated term creates an expansion term.

The regular expression engine 140 determines which expansion terms match an occurrence of a meaningful term in the corpus 130. A match between an expansion term and a meaningful term can be determined based on matching criteria. The matching expansion terms are returned as candidate expansion terms by the regular expression engine 140 in response to the request from the expansion engine 102.

Matching criteria for comparing a first term (e.g., an expansion term) and a second term (e.g., a meaningful term) can include, for example, requiring an exact match, in which the characters in the first term are the same as the characters in the second term, including in the same order with a one-to-one correspondence. Alternatively, the matching criteria can include determining that a base form of the first and second terms are the same. The base form can include, for example, converting the term into a particular verb conjugation, a singular form, or eliminating any prefixes or suffixes. Determination of matching criteria can include ignoring particular characters under predetermined conditions, such as "s" or "ing" at the end of a word. Determination of matching criteria can further consider predetermined character sets to be equivalent, such as based on phonetics. In another example, a numerical character can be considered equivalent to a corresponding word form (e.g., "2" is equivalent to "two").

Matching criteria for determining if a first and second character (either of which can include a group of characters) match include determining if the first and second characters are the same or equivalent, e.g., based on phonetics, or character forms of a numeric character.

The regular expression patterns can be configured in accordance with the naming rules. Accordingly, the regular expression characters are inserted in accordance with the naming rules. In one example, the naming rules use software developer naming conventions, such as generating names having a series of terms that are abbreviated by omitting vowels or truncating certain terms. In this way, an abbreviated term, from which vowels have been removed (e.g., HSHLD), can be expanded into a candidate expansion term "household." In another example, the regular expression pattern is configured so that an abbreviated term that was truncated (e.g., CUST) can be expanded to a corresponding expansion candidate term "customer." In yet another example, the regular expression pattern is configured so that an abbreviated term forming an acronym can be expanded into a series of candidate expansion terms.

For an abbreviated name that includes two or more abbreviated terms, multiple candidate expansion terms can be generated for each abbreviated term. The expansion engine 102 forms a plurality of candidate expansion expressions, each being a different permutation of candidate expansion terms that are expanded from two or more abbreviated terms included in the abbreviated name.

The expansion engine 102 determines similarity between the candidate expansion terms and expressions and the stored meaningful expressions, and selects one or more meaningful expressions based on the determined similarity. Additionally, a confidence score is assigned that reflects confidence in the selection. The determination of similarity is based on a term match ratio, collocation, and proximity, which are defined below.

Proximity is determined by comparing characters in a candidate expansion term to characters in a meaningful expression term based on replacement letter criteria and naming rules used to generate the names of the data store 120.

Replacement letter criteria can include a determination of a percentage of characters of the candidate expansion term that are replacement characters. Replacement characters are characters that replace the special expression characters of the regular expression. Another example criterion is the percentage of characters in the candidate term that match characters in the meaningful expression term which are replacement characters.

Naming rule criteria include determining whether the replacement characters are vowels or consonants. Fewer matches to replacement characters results in a higher confidence score. Fewer matches to replacement characters that are positioned towards the beginning of the meaningful term also results in a higher score. Characters in the meaningful term that match characters in the abbreviated term to which the meaningful term is being compared (e.g., the "V" in SRVC) also result in a higher score. In accordance with the naming rules, a higher confidence score is awarded to replacement characters that are vowels than for consonants. A further example criterion is a location in the meaningful term of the replacement characters. For example, a higher confidence score can be assigned when the replacement characters are located at the end of the meaningful term.

In an example, the regular expression H**S*H*LD generated for the abbreviated term "HSHLD" has four replacement characters that generate a candidate expansion term that are proximate to the meaningful term "household." All of the replacement characters are vowels, which corresponds to a high confidence score, as vowels are more likely than consonants to replace special characters of a regular expression in accordance with naming rules.

Term match ratio is a ratio of the number of candidate expansion terms in the candidate expansion expression that were determined to be similar (e.g., based on proximity and collocation) to the meaningful terms in a meaningful expression relative to a total number of candidate expansion terms in the candidate expansion expression.

The term "collocation," as used herein, refers to a relationship between first and second terms, including a criterion that the first and second terms are included in, or are expansions of, the same name or meaningful expression. In an embodiment, additional collocation criteria can further include the order of, and/or distance between, the first and second terms. The term "distance," as used herein, refers to the number of intervening terms (e.g., abbreviated or expanded) between the first and second terms. Collocation of candidate expansion terms generated from first and second abbreviated terms of a name can be compared to collocation of third and fourth meaningful terms of a meaningful expression, the first and third meaningful terms being proximate and the second and fourth terms being proximate. This can include comparing inclusion of the first and second terms in the name and inclusion of the third and fourth terms in the meaningful expression. Additionally, in an embodiment, determining collocation includes comparing order between the first and second terms to the order between the third and fourth terms. Additionally, in an embodiment, determining collocation includes comparing distance between the first and second terms to the distance between the third and fourth terms In another example of collocation, a first term in a first abbreviated name associated with a data store 120 can be matched to a second abbreviated term included in a second name associated with the data store 120. A third term in the second name that is collocated to the second term can be determined based on inclusion in the second name. Additionally, in an embodiment, the collocation is further based on the order of the second and third terms. Additionally, in an embodiment, the collocation is based on the distance between the second and third terms The expansion engine 102 further disambiguates when multiple meaningful terms or expressions are determined to be similar to the candidate expansion terms or expression based on proximity and collocation. Disambiguating, as defined herein, refers to selecting a final meaningful match from multiple meaningful terms or expressions that are determined to be similar.

Disambiguation of a final meaningful match from multiple meaningful expressions can further be performed using links, such as lineage or foreign keys that link to different data stores. A link is defined herein as a reference or connection to another data store 120 or entity in a data store 120. A link can include, for example, a name or address of the data store or entity, or a hyperlink that can be activated to connect to the data store or entity linked to. A foreign key is a link from one data store 120 to another data store 120. Lineage is defined herein as a relationship between two or more data stores, where one data store includes values obtained from other data stores. A lineage relationship can specify links from a plurality of entities in a single entity. For example, a numerical field value in a first table might be a calculated average of a plurality of fields in one or more tables different from the first table.

Importance of terms to which a term is collocated in the corpus 130 can further be used to adjust the confidence score associated with multiple meaningful expressions. The confidence score can be used to rank multiple meaningful matches or disambiguate between the multiple meaningful matches in order to select a final meaningful match. Importance is described in greater detail below.

For example, a meaningful term associated with a first term of a first name may collocate highly to a second term in a first plurality of names and to a third term in a second plurality of names in the corpus 130. The importance of the second and third terms can be used to determine which meaningful expression is most likely to be the final meaningful match for the first name. To illustrate, when processing a first term group "Customer History," multiple meaningful expressions that were determined to be similar based on proximity and collocation may include "Mobile Customer Subscription History" and "Customer Address History." If a second term group "Mobile Subscription" that is collocated with the first term group is marked as more important to the universe 150 than the a third term group "Address" that is also collocated with the first term group copy, the confidence score associated with the meaningful expression including "Mobile Subscription" can be adjusted to be higher than the confidence score associated with the meaningful expression including "Address."

Once disambiguated, the final meaningful match is associated with the current group of terms and stored in the terms dictionary 132. In the terms dictionary 132, the current group of terms functions as a key to the associated meaningful expression.

A confidence score is stored for each entry. The confidence score can indicate the strength of the similarity stored in the entry based on proximity, importance, collocation, and disambiguation. Additionally, the dictionary 132 is updated each time an entry matches a current name of a data store 120 that is being processed, including increasing the associated confidence score and storing information about the current name. Information associated with the current term group that is stored in the dictionary 132 includes, for example, identification of the associated data store 120, identification of the current name, identification of the entity in the data store that it names, and the entity's position in the data store 120.

The classification engine 104 determines a role of the current name or current term group in the data store. Roles include, for example, classification, function to reference a key, and function to reference a column or attribute. Classification, as defined herein, refers to identifying information associated with the current name, such as a meaningful expression, that indicates a meaning of the current name or a topic to which the current name belongs. The search engine 108 can use a classifying meaningful expression to determine whether an associated abbreviated name is relevant to a search query.

Classification can be determined using linguistics to determine which abbreviated terms of the current name are attributes of other terms in the current name. A term that is an attribute is less likely than other terms in the current name to be a significant term that indicates the meaning of the current name or a topic that the current name belongs to, which a search engine can use when determining if the current name is relevant to a search query.

A determination of whether the current name or term group provides classification can include determining which terms in the associated meaningful expression are significant terms. A meaningful term associated with a significant term of a name is more likely to classify the entity or data store that the name references.

A significant term of a name is a term that best describes the entity referenced by the name. For example, the name "CRDT_CHK_VRFCTN_SRC_AVT" can be expanded to the name "credit check verification source," after removing the stop word "AVT." The expression "credit check" is the part of the name that most significantly describes the entity.

Significance can be based on factors, such as language dependency, importance, frequency of an abbreviated term in the data store 120, frequency of the abbreviated term in the universe 150 (e.g., TFIDF), and location of occurrences of the abbreviated term in the data store 120.

The determination of language dependency can include natural language processing (NLP) in which pairs of meaningful terms, a dependency of one term on the other term of a pair, and/or attribution of a term or expression relative to another term or expression are identified. For example, a meaningful expression "dobson service access number" can be processed using NLP to identify term pairs "dobson service" and "access number." "Service" can be identified as dependent on "dobson," and "number" can be identified as dependent on "access." Additionally, "access number" can be identified as an attribute of "dobson service."

Importance can be predefined, such as by associating an assigned importance value to terms stored in the dictionary 132. For example, a higher importance can be assigned to terms for essential components of a business, and a lower importance can be assigned to general terms. For example, the term "customer" can be assigned a higher importance value than the term "format," as "customer" is an integral term in the telecommunications industry.

Importance can also be determined based on frequency of occurrence of the abbreviated terms in the data store and/or in the universe 150, such as using TFIDF. Terms that appear very frequently can be general terms that are less important (e.g., general terms such as "source" or "code"), however this is not always the case. Accordingly, TFIDF can be indicated by a ratio of frequency of a term in the data store 120 that the current name is located in (the current data store) to the frequency of the term in the data stores 120 included in universe 150 of the current data store 120.

Experimentation has shown that a term group (e.g., CUST_LOC) indicates a subject of a data store 120 (e.g., customer locations) when the term group appears in a name that references the data store 120 as well as in a plurality of names that reference entities of the data store 120. On the other hand, if the term group appears only in the name that references the data store 120, it is more likely that the term group references a key.

The system 100 includes a user interface engine 112 that can process information input by a user via an input device, and display information to the user on a display device, for example by presenting a graphical user interface (GUI). The input device can include, for example, a touch screen, keypad, keyboard, and/or a cursor control device (e.g., mouse, touchpad, or joystick). The user interface engine 112 can provide a user interface to any component of the system 100, including feedback engine 106, a search engine 108, and corpus developer engine 110. A user operates the feedback engine 106 to submit a request to process names of one or more data stores 120 and provide feedback during processing of a current name. Feedback can include selection of expansion candidate terms or expressions or meaningful expressions or terms, e.g., for relevance or correctness.

The search engine 108 processes a search query having query terms submitted by a user or other processing device by performing a search of the corpus 130 or dictionary 132 based on the query terms. The search engine 108 displays results to the user via the GUI, and processes the feedback from the user regarding relevance and correctness. The search engine 108 can further use the user's feedback to update the dictionary 132. When the query term(s) match meaningful term(s) stored in the dictionary 132, the search results can include data stored in an entity having a name that includes the associated abbreviated term(s).

Figure 2:
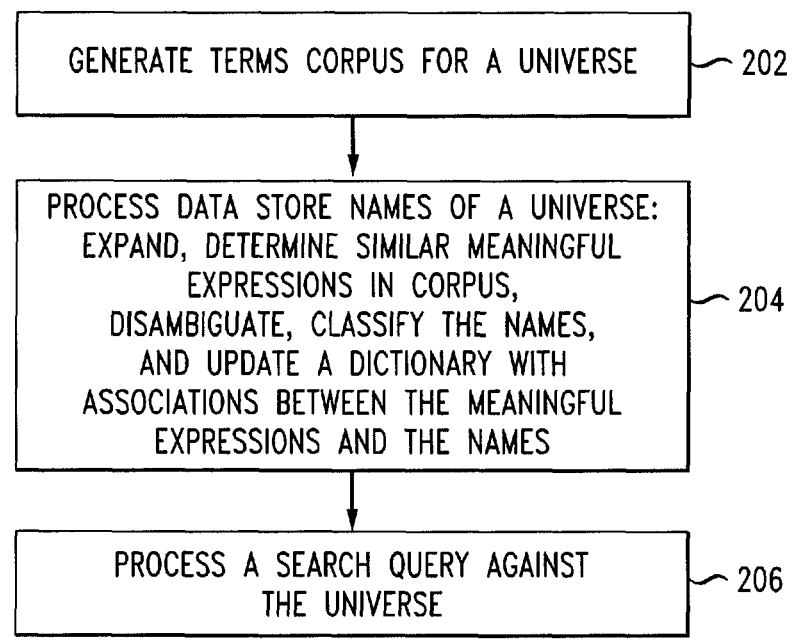
FIG. 2 shows a flowchart of stages to initialize and use a system that associates meaningful expressions to abbreviated names of data stores in accordance with the disclosure herein.

With reference to FIGS. 1 and 2, in a first stage 202, the corpus developer engine 110 generates the corpus 130 for one or more data stores 120 included in a universe 150. In a second stage 204, the system 100 processes names of the data stores 120. Processing a current name includes expanding terms included in the current name into candidate expansion terms. Processing the current name further includes selecting meaningful expressions or terms from the corpus 130 based on similarity to the candidate expansion terms. The system 100 updates the dictionary 132 by associating a selected meaningful expression with the current name. The current name and/or a selected meaningful expression can be processed to determine a role of the current name in the data store 120. For example, information about a role of the current name in the data store 120 can be determined by comparing terms in the current name to other names associated with the data store 120. In a third stage 206, the system 100 processes a search query against one or more data stores 120 that were previously processed according to the second stage. The system 100 can update the dictionary 132 by correlating query terms of the search query with an abbreviated name associated with the search results. Further detail concerning each of the stages is described below.

Figure 3:
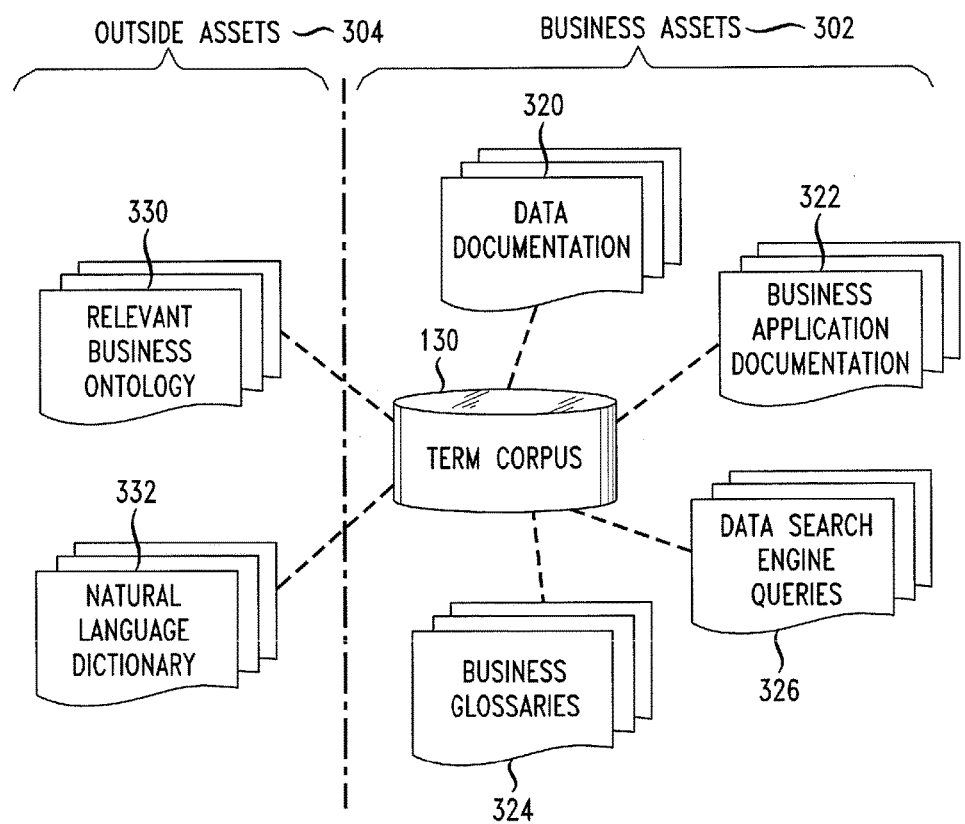
FIG. 3 shows a block diagram of data sources used to generate a corpus of meaningful terms in accordance with the disclosure herein.

FIG. 3 illustrates the third stage 206, during which the corpus developer engine 110 develops the corpus 130. The corpus 130 can be applied to a universe 150 that includes one or more data stores 120. In the example shown, the universe 150 and associated related data stores 120 are related to a genre of corporate business data. Other examples of genres related to a universe 150 and related data stores 120 include, without limitation, a government agency, a particular industry or sector, or a subject area, such as medicine or law.

The corpus developer engine 110 automatically, and/or with human intervention, analyzes information available in business assets 302 and outside assets 304 to locate meaningful terms and expressions and store these terms and expressions in the corpus 130.

In particular, meaningful terms or expressions are sought that might be similar to abbreviated terms used in abbreviated names of data stores 120 in universe 150. The business assets 302 include, but are not limited to, data documentation 320, business application documentation 322, business glossaries or dictionaries 324, and data search engine queries 326. Universe 150 can relate to various subject areas, such as medicine or law, and the assets 320-332 can be related to that subject area. The assets 320-332 are likely to include meaningful terms and expressions that can be stored in the corpus 130 and later associated with abbreviated terms and sequences of abbreviated terms used in names of data stores 120 of universe 150.

The data documentation 320 can include relevant business documentation, e.g., that is related to business topics, companies, and/or business products. Data documentation 320 can include textual documents, such as product catalogs and business reports. Additionally, the data documentation 320 can include documentation (e.g., comments and specifications) about different types of stored business data, such as business models, business diagrams, corporate taxonomies, or ontologies.

The business application documentation 320 includes documentation about relevant business applications, including comments (e.g., included with the programming code or in a Readme.txt file) and specifications. The business glossaries or dictionaries 324 include compilations of terminology used in relevant businesses. The search queries 326 are queries submitted to search engine 108 to request a search. Additionally, the outside assets 304 include a relevant business ontology 330 and a natural language dictionary 332.

The terms dictionary 132 can be included in or external to corpus 130. Each entry of dictionary 132 includes a meaningful expression associated with a group of one or more abbreviated terms of an abbreviated name. The group of abbreviated terms acts as a key to the associated meaningful expression. A confidence score is associated with each entry.

FIGS. 4A-D show flowcharts of embodiments of the method in accordance with the disclosure herein. It is to be noted that the embodiments shown in FIGS. 4A-D are only one example of the disclosed method and are not intended to limit the scope of the disclosure in any way.

The method begins at operation 402 in which abbreviated names of a data store 120 are accessed. The names accessed reference the data store 120 and entities included in the data store 120. The term "accessing," as used herein, can include examining, obtaining, receiving, or retrieving. The names can be accessed from the data store 120 or from the metadata 122 associated with the data store 120.

The accessed names are processed iteratively, e.g., one at a time, to expand abbreviated terms of the name and determine a similar meaningful expression. An abbreviated name currently processed during an iteration is referred to as the current name. At operation 404, the current name is compared to the groups of abbreviated terms stored as entries in the dictionary 132. If it is determined at operation 404 that the current name does match an entry in the dictionary 132, then the method continues at operation 405. At operation 405, the meaningful expression associated with the matching abbreviated name is further associated with the current name, and the confidence score associated with the matching entry in dictionary 132 is updated. Next, the method continues at operation 440 to determine whether all of the names of the data store 120 have been processed.

If it is determined at operation 404 that the current name does not match a meaningful expression entry in the dictionary 132, the method proceeds to operation 406 to search for meaningful terms in the corpus 130.

The current name is parsed at operation 406 to split the current name into abbreviated terms, e.g., using character delimiters, recognition of indications of separate terms based on case usage (e.g., as in CamelCase), or recursive searching for compounded terms. Terms that include stop words or abbreviations of stop words are removed from the current name at operation 408. A stop word is an abbreviation or term that has little or no significance with reference to a searchable meaning of the current name. For example, in the name "demographic_categories_avt," "avt" stands for allowed values table. The term "avt" would be of little or no added value in determining a similar meaningful expression. Stop words can be looked up from a list of stop words or determined based on frequency, such as by using an indication of TFIDF.

At operation 409, a current group of at least one term is selected. The terms in the current term group can be arranged in an ordered sequence.

A regular expression is generated at operation 410, including inserting regular expression characters into each abbreviated term of the current term group. At operation 411, the regular expressions are submitted to the regular expression engine 140, and candidate expansion terms are received from the regular expression engine 140.

At operation 412, it is determined whether additional permutations of candidate expansion expressions (fixated at operation 414) are available. The first time that operation 412 is performed, the determination is "Yes," and the method continues at operation 414. If the current term group includes a single term, and only a single candidate term is generated for the single term, the method continues at operation 416, with operations 414 and 416 being performed one time only. Otherwise, operation 416 will be performed at least two times.

The method includes performing operations 414 and 416 iteratively until all of the different permutations have been formed and processed, as determined at operation 412. Accordingly, a new candidate expansion expression is formed each time that operation 414 is performed, each candidate expansion expression having a different permutation of candidate expansion terms. Forming different permutations of candidate expansion terms can include omitting one or more of the candidate expansion terms. The sequence of candidate expansion terms in each candidate expansion expression is based on the sequence of associated abbreviated terms in the current term group.

A determination is made at operation 416 whether the current permutation is similar to a meaningful expression stored in the corpus 130. The determination is performed by comparing the current permutation of the candidate expansion expression to meaningful expressions stored in the corpus 130. Stop words included in the meaningful expressions stored in the meaningful expressions can be ignored. The current permutation of the candidate expansion expression is determined to be similar to a meaningful expression based on whether there is a predetermined degree of similarity between the current permutation of the candidate expansion expression and the meaningful expression. The determination of similarity is based on collocation and proximity. The collocation is determined by comparing a first collocation between meaningful terms of the meaningful expression and a second collocation of the candidate expansion terms. If the current term group includes only a single term, then the determination of similarity is based on proximity, but not collocated.

If, at operation 412, it is determined that all of the possible permutations of the candidate expansion expression for the current term group have not been exhausted, the method continues at operation 414, at which another permutation of the candidate expansion expression is generated and then processed at operation 416. When no further permutations can be generated, as determined at operation 412, the method continues at operation 418.

At operation 418, it is determined whether there is ambiguity, e.g., multiple meaningful expressions were determined to be similar during the iterations of operation 416. Upon a determination of ambiguity at operation 418, the method continues at operation 420.

Operations 420-432 perform disambiguation, including selecting a final meaningful match from the multiple meaningful expressions. In the embodiment shown, each term of the term group is processed individually for disambiguation. In another embodiment, the term group can be processed for disambiguation in pairs of terms or in groups of three or more terms. In still another embodiment, disambiguation can further be performed using links between different data stores, such as lineage or foreign keys.

During a first iteration of operation 420, a first term of the term group is selected for processing. The first term is associated with first candidate terms that were received at operation 411. During subsequent iterations of operation 420 a next term of the term group is selected for processing.

At operation 422, a determination is made of occurrences of names in the current data store 120 that include the term that was selected in operation 420. At operation 424, for each occurrence of a name determined at operation 422, a collocated term in the name is selected. The collocated term is a term that is included in an occurrence of the name that was determined. More than one collocated term can be selected at operation 424.

At operation 426, the selected collocated term is processed as a regular expression, including inserting regular expression characters into the selected collocated term, submitting the inserted term to the regular expression engine 140, and receiving second candidate expansion terms from the regular expression engine 140.

At operation 427, meaningful expressions are determined in the corpus 130 that include a first and second meaningful term that are similar to the respective first and second candidate expansion terms.

At operation 428, the multiple meaningful expressions are compared with a second term in each of the meaningful expressions determined at step 426, wherein the second term collocates with the first term. A meaningful expression that includes the first meaningful term is selected from the multiple meaningful expressions to be the final meaningful match.

Operation 430 determines whether disambiguation is completed. Completion includes failed or successful disambiguation. Disambiguation can be determined completed and successful when a final meaningful match is determined at operation 428. In this way, only one final meaningful match is selected. Alternatively, disambiguation can be determined to be completed and successful when all of the terms in the term group have been completed.

If every term in a term group has been processed, and a final meaningful match was not determined, then disambiguation failed. In this case, the multiple meaningful expressions can be associated with the current name and assigned a low confidence score, or alternatively, no meaningful expressions are associated with the current name. At operation 432, if ambiguity still exists, the best fitting final meaningful match(es) are selected, such as based on proximity. At operation 433, a confidence score is determined for final meaningful match(es) that were determined at operation 428.

In one embodiment, the steps 420-430 are performed until all of the terms in the term group have been processed, regardless of whether a final meaningful match has been determined. If multiple final meaningful matches are determined, they can be associated with the current name, but assigned a low confidence score. Alternatively, the best fitting final meaningful match(es) can be selected, such as based on proximity. If only one final meaningful match is determined, it is assigned a high confidence score. If the same final meaningful match is determined more than one time, then its confidence score is increased. The method continues at operation 436.

If it was determined at operation 418 that there was not ambiguity, the method continues at operation 434. A confidence score of the meaningful expression determined to be similar is determined at operation 434 based on proximity. Since there was no ambiguity, if there is a single meaningful expression determined to be similar, it is designated to be the final meaningful match.

At operation 436 the current term group is stored in the dictionary 132 in association with any final meaningful matches that were determined. The current term group is further stored in association with the current name. At operation 436, an indication of the permutation used to determine the final meaningful match and the confidence score determined are also stored in association with the current term group.

The method continues at operation 438, in which it is determined whether there are more terms to process in the current name. If it is determined at operation 438 that there are more terms to process, the method continues at operation 446. If it is determined at operation 438 that there are not any more terms to process in the current name, the method continues at operation 440.

At operation 440, it is determined whether there are more names of the data store 120 to process. If it is determined at operation 440 that there are more names to process, the method continues at operation 444 in which a next name is selected to be the current name, after which the method continues at operation 404 to process the current name. If it is determined at operation 440 that there are not any more names to process, the method ends.

If it was determined at operation 438 that there are more terms to process, the method continues at operation 446. At operations 446-462 each meaningful expression included in the final meaningful match is processed for determining role information. The role information indicates the role of the current name in the data store 120 and/or how reliable the meaningful expression is to a search engine. For clarity, operations 446-464 refer to processing a single meaningful expression included in the final meaningful match. However, if the final meaningful match includes multiple meaningful expressions, each meaningful expression is processed. At operation 446, stop words are removed from the final meaningful match. Prepositions are removed from the final meaningful match at operation 448. Collocation is evaluated at operation 434. The collocation evaluation can include determining how many times the current term group occurs in meaningful expressions stored in the corpus 130. A high number of occurrences (e.g., exceeding a predetermined threshold), indicates that the current term group can be evaluated as a unit, rather than by parsing it into individual terms that are evaluated separately.

At operation 452, the base form is determined for each term in the final meaningful match. For example, terms of final meaningful match that occur in a plural form are converted into a singular base form to enhance searchability. The base form can be the root of a term, e.g., with prefixes and suffixes removed, that can be used to search for other terms that use the same root.

A relative position of the current term group in the current name is determined at operation 454. Using the naming rules, the relative position provides an indication regarding the role of the current term in the current name, and the role of the current name in the data store 120. Roles can include referencing a key or providing classification information that is useful to a search engine. For example, when the current term group forms the entire current name or is positioned at the end of the current name, then it is likely that the final meaningful match provides classification information about the referenced data store or entity. In another example, when the current term group is positioned at the beginning of the current name, and the current name references the data store 120, then the final meaningful match is likely to reference a key for items included in the data store 120. Additionally, experimentation has demonstrated that when the term groups evaluated are term pairs, and a single term remains after all of the available term pairs in the current name have been evaluated, there is a high probability that the single term references a key.

At operation 456, role information is gleaned by determining frequency of use of the current term group within the data store 120. For example, if an abbreviated term is used only once in the data store 120, the selected meaningful expression related to the abbreviated term may reference a key. Additionally, classification information can be gleaned by determining frequency of occurrences of the current term group in the data store 120 relative to frequency of occurrences of the current term group in the universe 150 (e.g., TFIDF). Additionally, classification information about the current term group can be gleaned when the current name references the data store 120 by determining the frequency of occurrences of the current term group in the data store 120. For example, when the current name references the data store 120 and includes the term "LOC", if "LOC" occurs only one additional time in the data store 120, "LOC" is likely to represent a key of the data store 120. Conversely, when "LOC" occurs multiple times in the data store 120, "LOC" is not likely to reference a key. Rather, the final meaningful match indicates classifying information about the data store 120, e.g., that the data store represents some type of location.

At operation 458, the final meaningful match is evaluated for language dependency, which can be used to evaluate significance of a term within the current term group or within the current name. At operation 460, the importance of terms in the current term group is evaluated by consulting a reference source (not shown) or based on frequency of the terms in the current data store 150, e.g., TFIDF.

At operation 462, the role of the current term group is determined based on the determined relative position, frequency, language dependency, and importance. At operation 464, role information is stored in association with the current term group and the current name in the dictionary 132. Accordingly, an entry for an abbreviated term group stored in the dictionary 132 includes data indicating its role, e.g., classification, significance, and importance, as well as final meaningful matches, term(s) that the current term group is collocated with, and the nature of the collocation (e.g., order and distance with respect to another one or more abbreviated terms), the abbreviated name the term group is included in, and a confidence score. The abbreviated term group is stored in the dictionary 132 as a key for the associated final meaningful match. The method continues at operation 442, in which a next term group, or a remaining term, is selected from the current name to be processed as the current term group. If only one remaining term remains, then the remaining term is selected to be processed as the current term group.

Figure 4A:
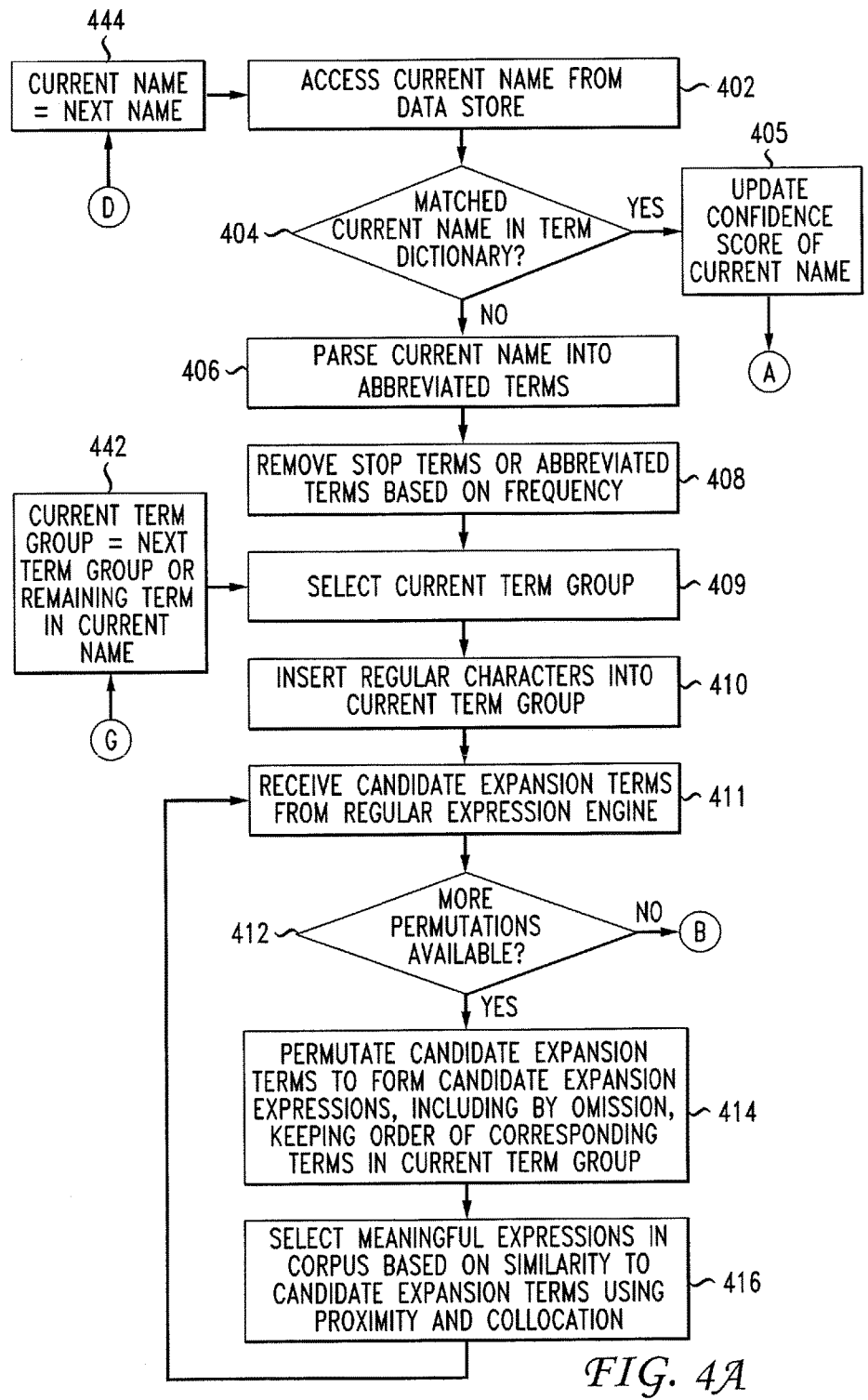
FIGS. 4A, 4B, 4C, and 4D show a flowchart of a method to expand, disambiguate, and classify abbreviated names of data stores in accordance with the disclosure herein.
Figure 4B:
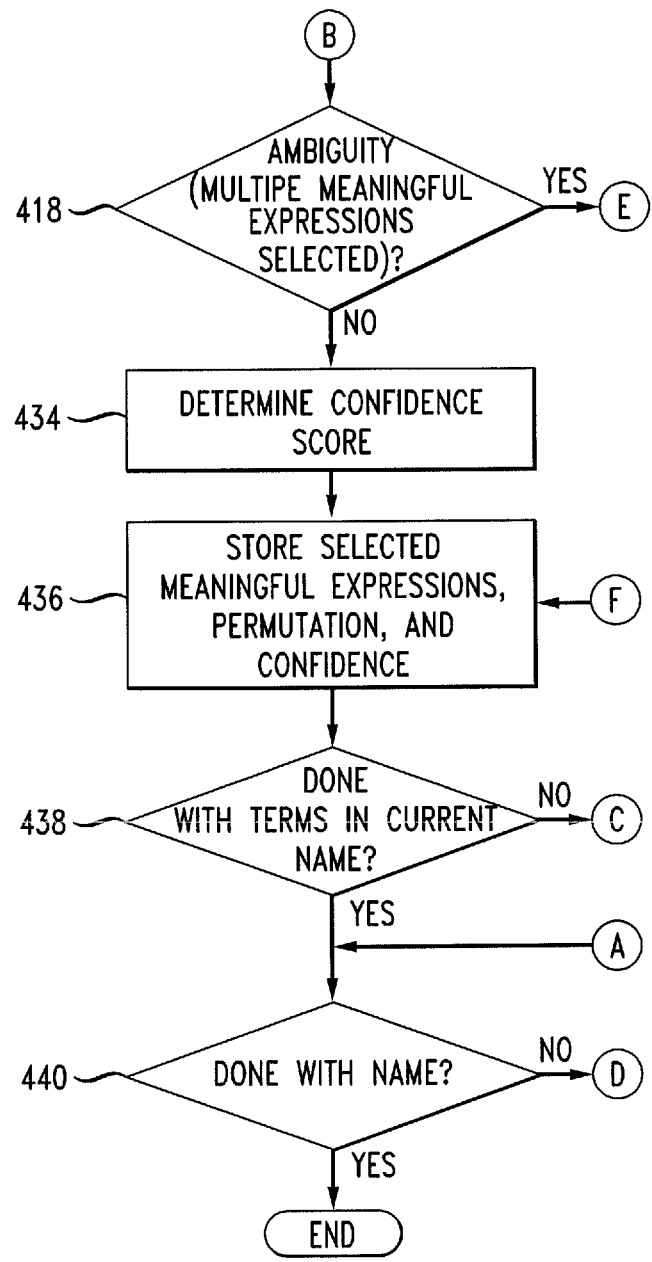
Figure 4C:
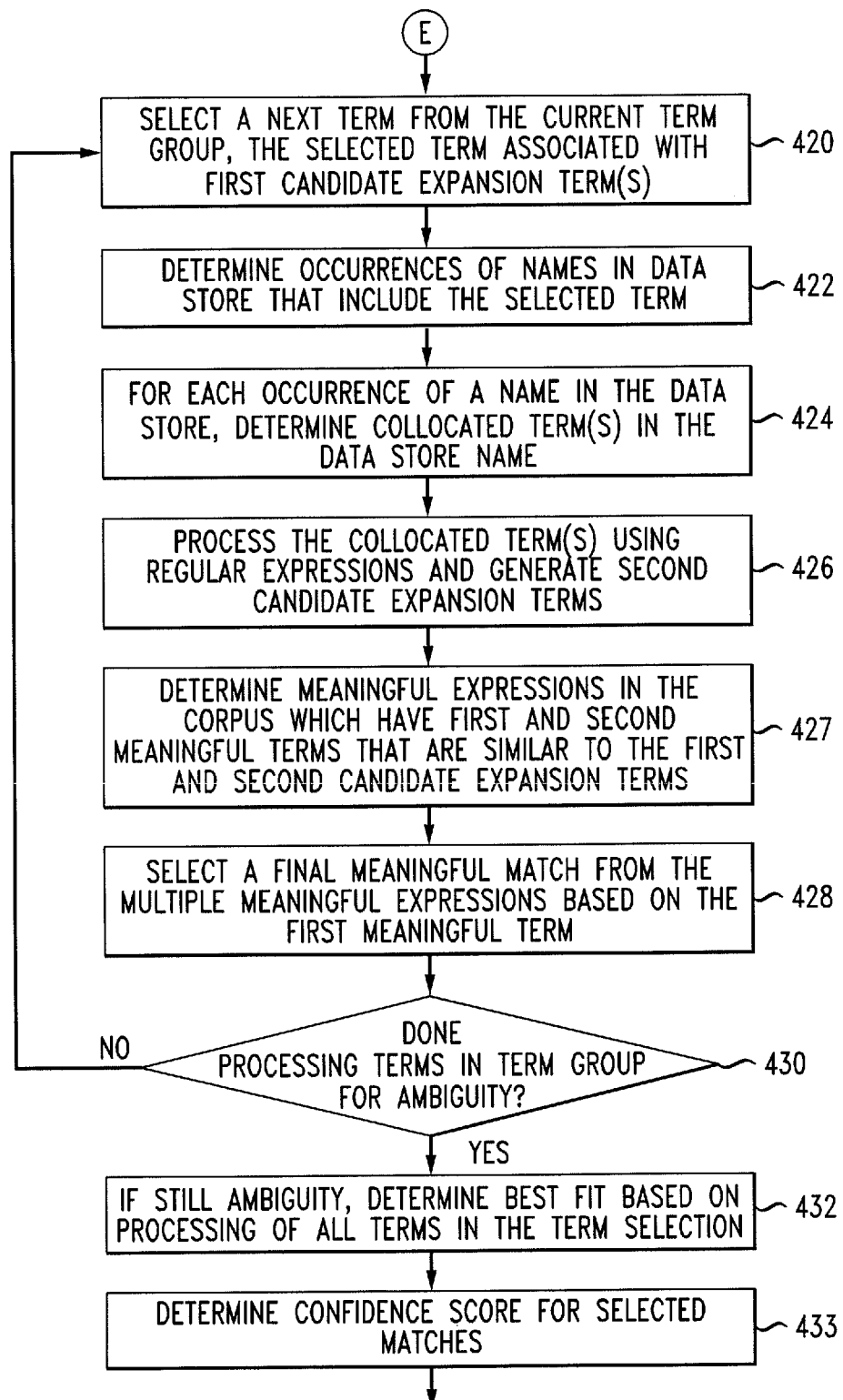
Figure 4D:
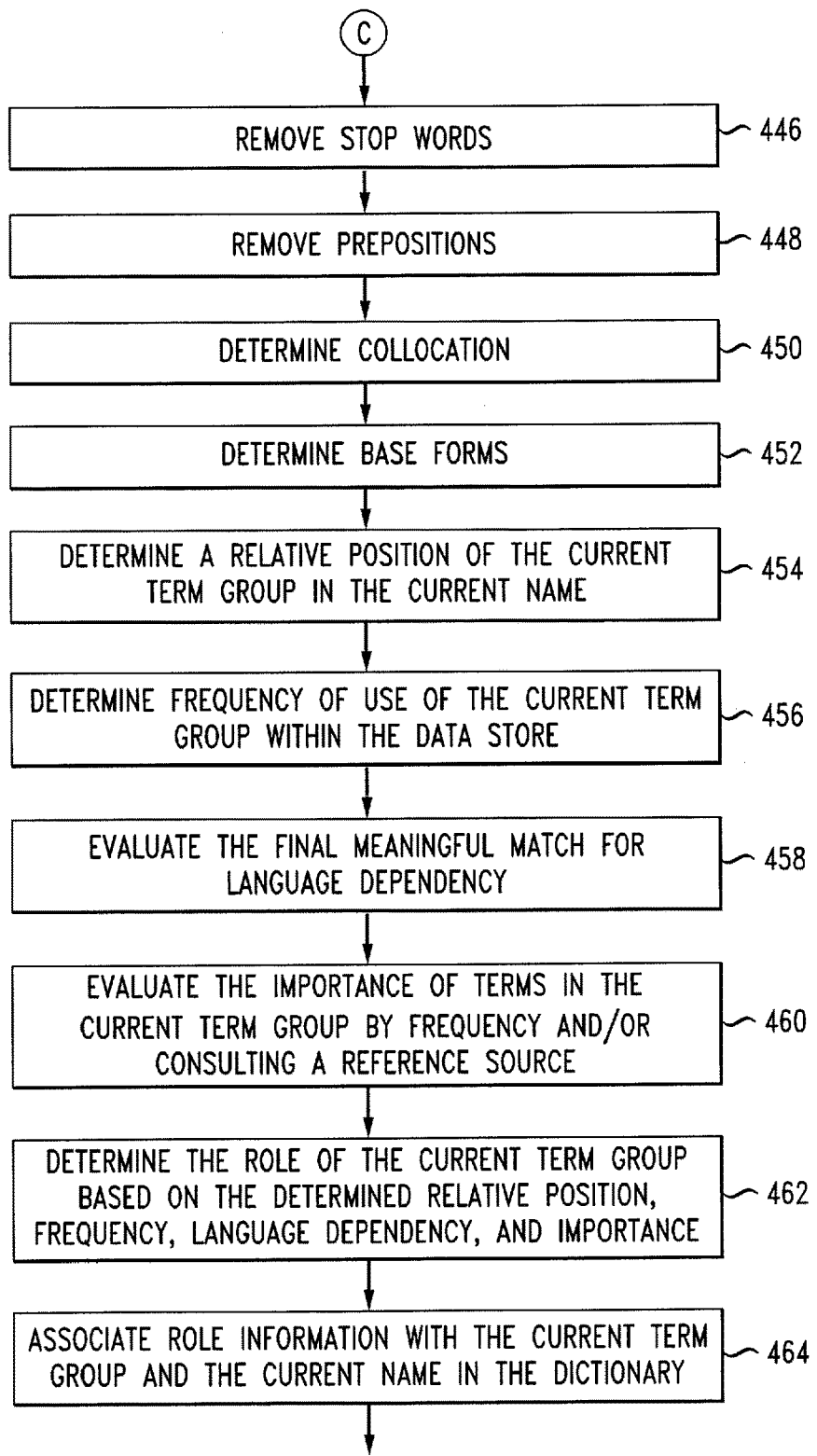
Figure 5:
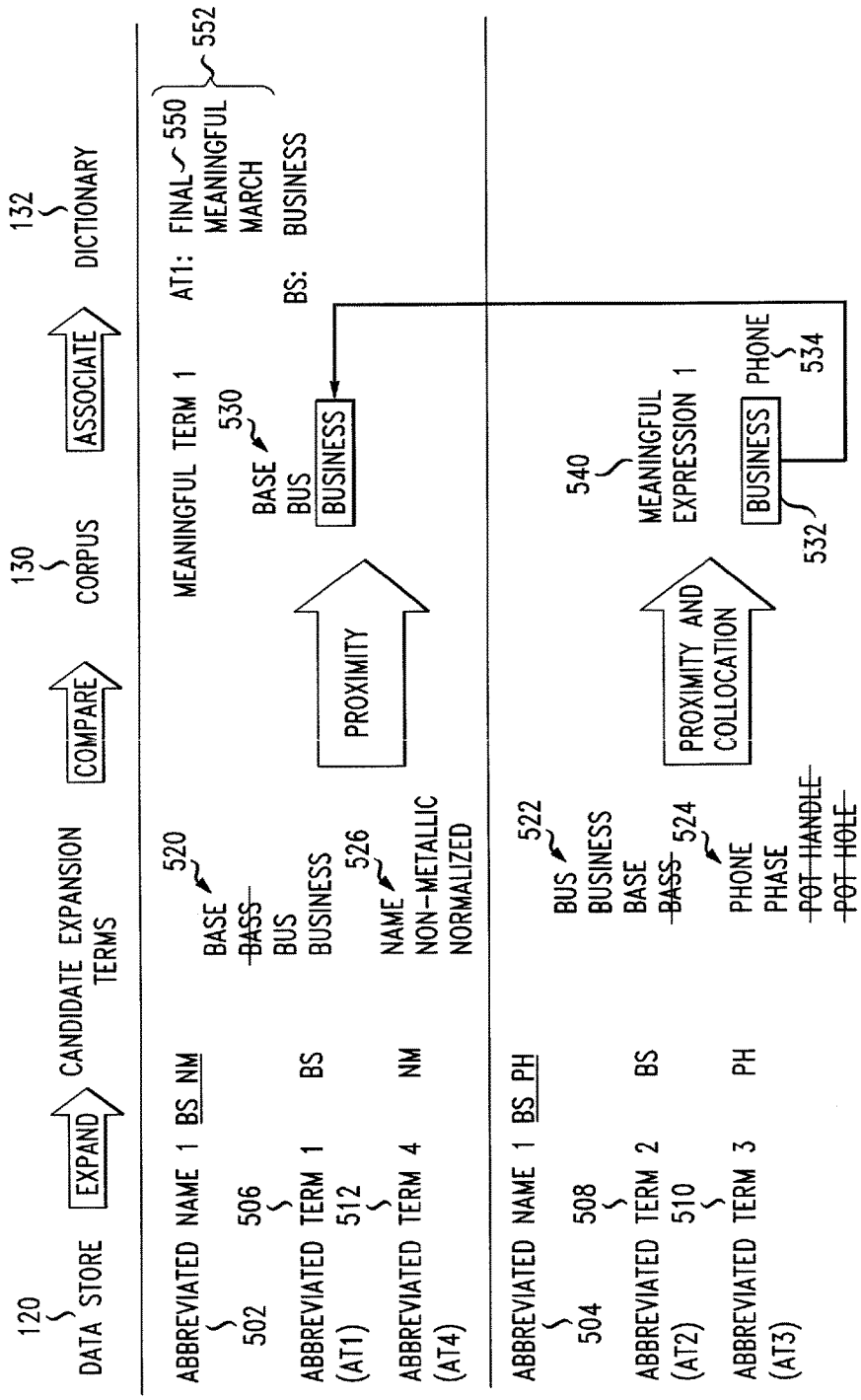
FIG. 5 shows a diagram of processing an abbreviated name of a data store in accordance with the method of the disclosure.

FIG. 5 shows an example of processing a first abbreviated name 502 BS_NM associated with a data store 120 in accordance with the method shown in FIGS. 4A-C. The data store 120 is associated with a plurality of abbreviated names which reference the data store 120 and entities of the data store 120. The first abbreviated name 502 is parsed into at least one abbreviated term (AT1) 506 BS.

After removing stop words, the AT1 506 is selected to be processed as the current term group. A regular expression is generated for AT1 506, including inserting regular characters into AT1 506. The regular expression is submitted to regular expression engine 140 and a plurality of expansion terms are generated, including base, bus, and business. The examples provided are a non-exhaustive list for illustration purposes. The expansion terms are compared to the meaningful terms in the corpus 130 and matches are returned to the expansion engine 102 as candidate expansion terms 520. Since there were not any meaningful terms located in the corpus 130 that are similar to the term bass, bass is not included as candidate expansion term 520 and is shown crossed-out. Each of the candidate expansion terms is processed individually as a permutation of the candidate expansion terms and compared for similarity to meaningful terms in the corpus 130. Since the current term group includes the single term AT1 506, the comparison of each candidate expansion term is performed using proximity, but not collocation.

Multiple meaningful first terms 530, including base, bus, and business, are determined to be similar to the candidate expansion terms 520 based on proximity. Disambiguation is performed to determine a final meaningful match from the multiple meaningful first terms 530.

Disambiguation is performed by comparing AT1 506 to abbreviated terms of abbreviated names in the data store 120 to determine a match by applying at least one matching criterion. A second abbreviated name 508 BS_PH is selected from the plurality of names associated with the data store 502 because it has an abbreviated term (AT2) 508 BS that is determined to match AT1 506 BS based on satisfaction of the at least one matching criterion. For example, the abbreviated terms AT2 508 BS and AT3 510 BS are exact matches because they include exactly the same characters. Other matching criteria can include ignoring predetermined characters based on location of the character in the term, and/or taking equivalence into consideration.

The second abbreviated name 504 is processed to determine a third abbreviated term such that the third abbreviated term and AT2 508 satisfy at least one collocation criterion. A third abbreviated term (AT3) 510 is determined to satisfy the at least one collocation criterion. For example, AT2 508 and AT3 510 satisfy the collocation criterion of being included in the same abbreviated name. Additional collocation criteria can include order of the terms and distance between the terms.

A regular expression is generated for each of AT2 508 and AT3 510 and submitted to the regular expression engine 140. Candidate expansion terms 522 are generated that correspond to AT2 508 BS, which are the same as candidate expansion terms 520. Since AT1 506 and AT2 508 are identical, the candidate expansion terms 522 can be selected based on candidate expansion terms 520 without generating or processing a regular expression. A regular expression is generated that corresponds to AT3 510 PH and is submitted to regular expression engine 140. Regular expression engine 140 expands the regular expression and generates a plurality of expansion terms, including phone and phase (provided as a non-exhaustive list for illustration purposes). The expansion terms are compared to the meaningful terms in the corpus 130 and matches are returned to the expansion engine 102 as candidate expansion terms 524. Since there were not any meaningful terms located in the corpus 130 that are similar to the terms pot handle and pot hole, the terms pot handle and pot hole are not included as candidate expansion term 524 and are shown crossed-out.

Candidate expansion terms 522 and 524 are compared for similarity to meaningful expressions in the corpus 130 that have second and third meaningful terms. Similarity is determined by comparing a combination of meaningful terms in meaningful expressions in corpus 130 to a combination of candidate expansion terms from each of the candidate expansion terms 522 and 524. The similarity is determined based on proximity of the second meaningful term and one of the second candidate expansion term 522 in the combination of candidate expansion terms, and proximity between the third meaningful term and one of the third candidate expansion terms 524 in the combination of candidate expansion terms.

Similarity is further determined based on collocation between the second and third meaningful terms 532, 534 and collocation between the second and third abbreviated terms AT2 508, AT3 510 from which the second and third candidate expansion terms were expanded e.g., using regular expressions. Collocation can be based on being included in or expanded from the same meaningful expression or abbreviated name. Additionally, collocation can be based on the order of the terms and/or the distance between the terms.

A meaningful expression 540 that includes a combination of a second meaningful term 532 business and a third meaningful term 534 phone that satisfies the at least one similarity criterion is selected from the corpus 130. The second meaningful term 532 is compared to the multiple meaningful first terms 530 for determination of satisfaction of at least one matching criterion, e.g., an exact match or an equivalent. A final meaningful match 550 that satisfies the at least one matching criterion is selected from the multiple meaningful terms. In the example shown, the meaningful term business included in the multiple meaningful matches 530 is selected as the final meaningful match 550 because it satisfies the at least one matching criterion for matching the second meaningful term 532 business.

The dictionary 132 is updated by generating an entry 552 that includes an association between the AT1 506 BS and the final meaningful match 550 business.

The first abbreviated name 502 may include at least one more additional abbreviated terms (AT4) 512, which can be selected as the next current term group. Alternatively, the AT1 506 can be processed together with AT4 512 as a current term group. In this case, candidate expansion terms 526 can be generated for AT4. A combination of a candidate expansion term from the candidate expansion terms 520 that correspond to AT1 506 and a candidate expansion term from candidate expansion terms 526 that correspond to AT4 512 can be compared for similarity to a combination of fourth and fifth meaningful terms in meaningful expressions of corpus 130. In this example, the determination of similarity would be based on proximity between AT1 506 and the fourth meaningful term, and proximity between AT4 512 and the fifth meaningful term. Additionally, similarity would be determined based on collocation of AT1 506 and AT4 512, and collocation of the fourth and fifth meaningful terms.

Figure 6:
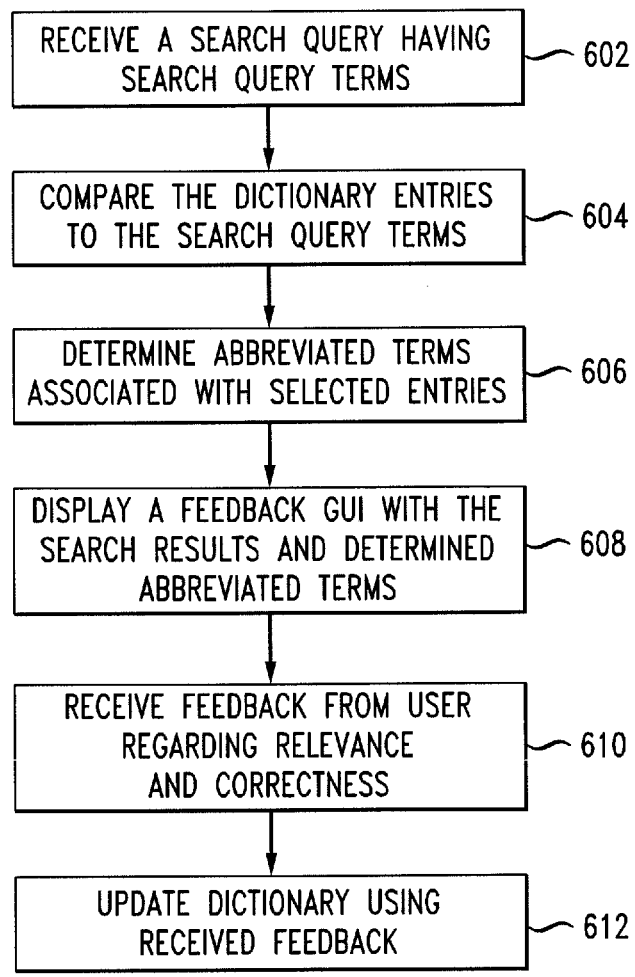
FIG. 6 shows a flowchart of a method to process a search query and user feedback regarding relevance and correctness of search results in accordance with the disclosure herein.

FIG. 6 shows a flowchart of an embodiment of the method in accordance with the disclosure herein. It is to be noted that the embodiment shown in FIG. 6 is only one example of the disclosed method and is not intended to limit the scope of the disclosure in any way. With reference to FIG. 6, the method for processing a search query begins at operation 602, in which a search query including at least one meaningful query term is received. The dictionary 132 is searched at operation 604, using the query term(s) as a search key. Search results are generated that include one or more entries in the dictionary 132 that match the at least one meaningful query term. The match is determined by comparing the query term(s) to meaningful expressions, expressions, and terms stored in the dictionary 132 based on matching characters, relevancy, and/or collocation, and a percentage of terms in the query that match terms in the entry. Relevancy is evaluated based on similarity between the meaning of the terms in the entry and the query. Terms may be considered relevant to one another, for example, if they are synonyms or relate to the same topic in similar ways. Terms can be relevant to one another even if they use different grammatical forms. Collocation is evaluated by comparing collocation of the first and second meaningful terms of the entry with collocation of first and second matching query terms. The entries included in the search results are ranked by a confidence score based on degrees of matching, relevancy, and collocation.

The abbreviated terms associated with each of the matches included in the search results are determined at operation 606. At operation 608, the determined matches and the determined data stores 120 are displayed via a GUI that is configured to display results and receive feedback. User feedback is received at operation 610 regarding correctness of the determined matching entries. For example, the user can indicate whether a determined entry matches the query terms based on similarity, relevancy, and/or collocation. Additionally, the user can provide feedback about correctness of the relationship between the entry's terms and the associated abbreviated terms. For example, the user can provide feedback regarding the user's confidence level (e.g., strong, good, weak, not matching) of the match between the entry's terms and the associated abbreviated terms. The dictionary is updated at operation 612 using the received feedback, including updating the confidence score of the association between the abbreviated terms and the entry, or disassociating the abbreviated terms from the entry.

Figure 7:
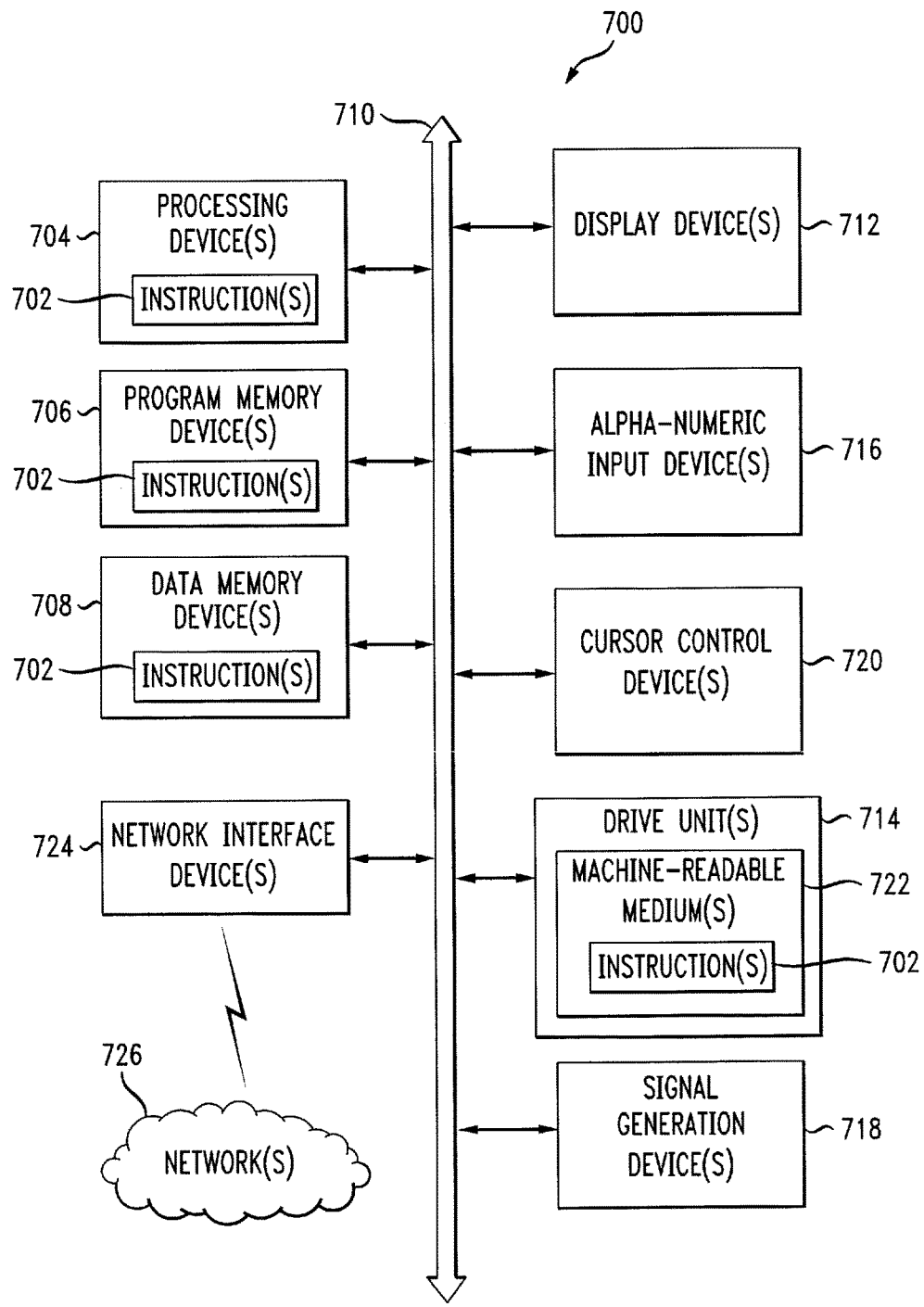
FIG. 7 is a block diagram showing at least a portion of an exemplary machine in the form of a computing system configured to perform methods according to one or more embodiments disclosed herein.

FIG. 7 is a block diagram of an embodiment of a machine in the form of a computing system 700, within which a set of instructions 702, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 700 may include a processing device(s) 704 (e.g., a central processing unit (CPU), a graphics processing unit (GPU), or both), program memory device(s) 706, and data memory device(s) 708, which communicate with each other via a bus 710. The computing system 700 may further include display device(s) 712 (e.g., liquid crystals display (LCD), a flat panel, a solid state display, or a cathode ray tube (CRT)). The computing system 700 may include input device(s) 716 (e.g., a keyboard), cursor control device(s) 720 (e.g., a mouse), disk drive unit(s) 714, signal generation device(s) 718 (e.g., a speaker or remote control), and network interface device(s) 724.

The disk drive unit(s) 714 may include machine-readable medium(s) 722, on which is stored one or more sets of instructions 702 (e.g., software) embodying any one or more of the methodologies or functions disclosed herein, including those methods illustrated herein. The instructions 702 may also reside, completely or at least partially, within the program memory device(s) 706, the data memory device(s) 708, and/or within the processing device(s) 704 during execution thereof by the computing system 700. The program memory device(s) 706 and the processing device(s) 704 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present embodiment contemplates a machine-readable medium or computer-readable medium containing instructions 702, or that which receives and executes instructions 702 from a propagated signal so that a device connected to a network environment 726 can send or receive voice, video or data, and to communicate over the network 726 using the instructions 702. The instructions 702 may further be transmitted or received over a network 726 via the network interface device(s) 724. The machine-readable medium may also contain a data structure for storing data useful in providing a functional relationship between the data and a machine or computer in an illustrative embodiment of the disclosed systems and methods.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the disclosed subject matter may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more programs running on a processing device. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing, can also be constructed to implement the methods, functions or logic described herein.

It should also be noted that software, which implements the disclosed methods, functions or logic, may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the disclosed subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments may be referred to herein, individually and/or collectively, by the term "embodiment" merely for convenience and without intending to voluntarily limit the scope of this application to any single embodiment or concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, disclosed subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system comprising:
   a processing device; and
   a storage device storing instructions that, when executed by the processing device, cause the processing device to perform operations, the operations comprising:
   selecting a first meaningful term based on a similarity between the first meaningful term and an expansion of a first abbreviated term, the selecting of the first meaningful term being based on a satisfaction of a collocation criterion associated with a second abbreviated term and a third abbreviated term, wherein the first meaningful term, the first abbreviated term, the second abbreviated term, and the third abbreviated term are obtained from a data store, the first abbreviated term being associated with a first abbreviated name, the second abbreviated term and the third abbreviated term being associated with a second abbreviated name, and the second abbreviated term satisfying a matching criterion associated with the first abbreviated term, wherein the collocation criterion comprises at least one of: the second abbreviated term and the third abbreviated term are both included in the second abbreviated name, or an expansion of the second abbreviated term and an expansion of the third abbreviated term are both included in a same meaningful expression;
   associating the first meaningful term with the first abbreviated term in the data store;
   processing a search query received from a user, the processing including comparing a query term of the search query to the first meaningful term in the data store;
   displaying the first meaningful term and the first abbreviated term to the user via a display device in response to the processing; and
   associating the query term with the first abbreviated term based on user feedback received from the user regarding a correctness of the associating of the first meaningful term with the first abbreviated term in the data store.

2. The system defined by claim 1, wherein the operations further comprise selecting a first meaningful expression based on a similarity between a first combination and a second combination, the first combination including a second meaningful term and a third meaningful term, the second combination including the expansion of the second abbreviated term and the expansion of the third abbreviated term, the first meaningful expression including the second meaningful term and the third meaningful term.

3. The system defined by claim 2, wherein the operations further comprise selecting the first meaningful term based on the second meaningful term.

4. The system defined by claim 2, wherein the operations further comprise:
   selecting a second meaningful expression including the first meaningful term and a fourth meaningful term, the fourth meaningful term being selected based on a similarity between the fourth meaningful term and an expansion of a fourth abbreviated term associated with the first abbreviated name, the second meaningful expression being selected based on a first collocation and a second collocation, the first collocation being associated with the first meaningful term and the fourth meaningful term, the second collocation being associated with the expansion of the first abbreviated term and the expansion of the fourth abbreviated term; and
   associating the first abbreviated term and the fourth abbreviated term with the second meaningful expression.

5. The system defined by claim 1, wherein the operations further comprise generating a regular expression associated with the first abbreviated term, the expansion of the first abbreviated term being based on the regular expression.

6. The system defined by claim 1, wherein the first abbreviated name and the second abbreviated name are associated with the data store, the operations further comprising:
   determining a first frequency of occurrence of the first abbreviated term in a first plurality of names associated with the data store;

determining a second frequency of occurrence of the first abbreviated term in a second plurality of names, the second plurality of names being associated with a plurality of data stores, the plurality of data stores being included in a universe, the universe including the data store; and determining a role of the first abbreviated term based on the first frequency of occurrence and the second frequency of occurrence.

7. The system defined by claim 1, wherein the first abbreviated name and the second abbreviated name are associated with the data store, the operations further comprising:

determining a frequency of occurrence of the first abbreviated term in a first plurality of names, the first plurality of names being associated with the data store; and determining a role of the first abbreviated term based on the frequency of occurrence and a position of the first abbreviated term in the first abbreviated name.

8. A method comprising:

selecting, using a processing device, a first meaningful term based on a similarity between the first meaningful term and an expansion of a first abbreviated term, the selecting of the first meaningful term being based on a satisfaction of a collocation criterion associated with a second abbreviated term and a third abbreviated term, wherein the first meaningful term, the first abbreviated term, the second abbreviated term, and the third abbreviated term are obtained from a data store, the first abbreviated term being associated with a first abbreviated name, the second abbreviated term and the third abbreviated term being associated with a second abbreviated name, and the second abbreviated term satisfying a matching criterion associated with the first abbreviated term, wherein the collocation criterion comprises at least one of: the second abbreviated term and the third abbreviated term are both included in the second abbreviated name, or an expansion of the second abbreviated term and an expansion of the third abbreviated term are both included in a same meaningful expression;

associating, using the processing device, the first meaningful term with the first abbreviated term in the data store;

processing, using the processing device received from a user, a search query, the processing including comparing a query term of the search query to the first meaningful term in the data store;

displaying, using the processing device, the first meaningful term and the first abbreviated term to the user via a display device in response to the processing; and associating, using the processing device, the query term with the first abbreviated term based on user feedback received from the user regarding a correctness of the associating of the first meaningful term with the first abbreviated term in the data store.

9. The method defined by claim 8, wherein the method further comprises selecting a first meaningful expression based on a similarity between a first combination and a second combination, the first combination including a second meaningful term and a third meaningful term, the second combination including the expansion of the second abbreviated term and the expansion of the third abbreviated term, the first meaningful expression including the second meaningful term and the third meaningful term.

10. The method defined by claim 9, wherein the method further comprises selecting the first meaningful term based on the second meaningful term.

11. The method defined by claim 9, wherein the method further comprises:

selecting a second meaningful expression including the first meaningful term and a fourth meaningful term, the fourth meaningful term being selected based on a similarity between the fourth meaningful term and an expansion of a fourth abbreviated term associated with the first abbreviated name, the second meaningful expression being selected based on a first collocation and a second collocation, the first collocation being associated with the first meaningful term and the fourth meaningful term, the second collocation being associated with the expansion of the first abbreviated term and the expansion of the fourth abbreviated term; and associating the first abbreviated term and the fourth abbreviated term with the second meaningful expression.

12. The method defined by claim 8, wherein the method further comprises generating a regular expression associated with the first abbreviated term, the expansion of the first abbreviated term being based on the regular expression.

13. The method defined by claim 8, wherein the first abbreviated name and the second abbreviated name are associated with the data store, and the method further comprises:

determining a first frequency of occurrence of the first abbreviated term in a first plurality of names associated with the data store;

determining a second frequency of occurrence of the first abbreviated term in a second plurality of names, the second plurality of names being associated with a plurality of data stores, the plurality of data stores being included in a universe, the universe including the data store; and determining a role of the first abbreviated term based on the first frequency of occurrence and the second frequency of occurrence.

14. The method defined by claim 8, wherein the first abbreviated name and the second abbreviated name are associated with the data store, and the method further comprises:

determining a frequency of occurrence of the first abbreviated term in a first plurality of names, the first plurality of names being associated with the data store; and determining a role of the first abbreviated term based on the frequency of occurrence and a position of the first abbreviated term in the first abbreviated name.

15. A non-transitory computer-readable medium storing instructions that, when executed by a processing device, cause the processing device to perform operations, the operations comprising:

selecting a first meaningful term based on a similarity between the first meaningful term and an expansion of a first abbreviated term, the selecting of the first meaningful term being based on a satisfaction of a collocation criterion associated with a second abbreviated term and a third abbreviated term, wherein the first meaningful term, the first abbreviated term, the second abbreviated term, and the third abbreviated term are obtained from a data store, the first abbreviated term being associated with a first abbreviated name, the second abbreviated term and the third abbreviated term being associated with a second abbreviated name, and the second abbreviated term satisfying a matching criterion associated with the first abbreviated term, wherein the collocation criterion comprises at least one of: the second abbreviated term and the third abbreviated term are both included in the second abbreviated name, or an expansion of the second abbreviated term and an expansion of the third abbreviated term are both included in a same meaningful expression;

associating the first meaningful term with the first abbreviated term in the data store;

processing a search query received from a user, the processing including comparing a query term of the search query to the first meaningful term in the data store;

displaying the first meaningful term and the first abbreviated term to the user via a display device in response to the processing; and associating the query term with the first abbreviated term based on user feedback received from the user regarding a correctness of the associating of the first meaningful term with the first abbreviated term in the data store.

16. The non-transitory computer-readable medium defined by claim 15, wherein the operations further comprise:

selecting a first meaningful expression based on a similarity between a first combination and a second combination, the first combination including a second meaningful term and a third meaningful term, the second combination including the expansion of the second abbreviated term and the expansion of the third abbreviated term, the first meaningful expression including the second meaningful term and the third meaningful term.

17. The non-transitory computer-readable medium defined by claim 16, wherein the operations further comprise:

selecting the first meaningful term based on the second meaningful term.

18. The non-transitory computer-readable medium defined by claim 16, wherein the operations further comprise:

selecting a second meaningful expression including the first meaningful term and a fourth meaningful term, the fourth meaningful term being selected based on a similarity between the fourth meaningful term and an expansion of a fourth abbreviated term associated with the first abbreviated name, the second meaningful expression being selected based on a first collocation and a second collocation, the first collocation being associated with the first meaningful term and the fourth meaningful term, the second collocation being associated with the expansion of the first abbreviated term and the expansion of the fourth abbreviated term; and associating the first abbreviated term and the fourth abbreviated term with the second meaningful expression.

19. The non-transitory computer-readable medium defined by claim 15, wherein the operations further comprise:

generating a regular expression associated with the first abbreviated term, the expansion of the first abbreviated term being based on the regular expression.

20. The non-transitory computer-readable medium defined by claim 15, wherein the first abbreviated name and the second abbreviated name are associated with the data store, and wherein the operations further comprise:

determining a first frequency of occurrence of the first abbreviated term in a first plurality of names associated with the data store;

determining a second frequency of occurrence of the first abbreviated term in a second plurality of names, the second plurality of names being associated with a plurality of data stores, the plurality of data stores being included in a universe, the universe including the data store; and determining a role of the first abbreviated term based on the first frequency of occurrence and the second frequency of occurrence.

* * * * *